United States Patent [19]

Singh et al.

[11] Patent Number: 4,608,219
[45] Date of Patent: Aug. 26, 1986

[54] TIRE PRESS, LOADER AND METHOD

[75] Inventors: Anand P. Singh, Youngstown; Thomas A. Crumbacher, Columbiana; Gary R. Naylor, Canfield; Thomas R. Fagan, Jr., Atwater, all of Ohio

[73] Assignee: NRM Corporation, Columbiana, Ohio

[21] Appl. No.: 743,648

[22] Filed: Jun. 11, 1985

[51] Int. Cl.⁴ .............................................. B29H 5/02
[52] U.S. Cl. ..................................... 264/315; 425/38; 425/43
[58] Field of Search ....................... 425/33, 38, 43, 32; 264/315

[56] References Cited

U.S. PATENT DOCUMENTS

| | | | |
|---|---|---|---|
| 3,222,715 | 12/1965 | Harris | 425/32 |
| 3,396,221 | 8/1968 | Balle et al. | 425/43 X |
| 3,530,533 | 9/1970 | Turk et al. | 425/38 X |
| 3,845,979 | 11/1974 | Schatz et al. | 425/38 X |
| 4,025,251 | 5/1977 | Cantarutti | 425/38 X |
| 4,236,883 | 12/1980 | Turk et al. | 425/38 X |
| 4,332,536 | 6/1982 | Singh et al. | 425/33 |
| 4,395,209 | 7/1983 | Singh et al. | 425/38 X |
| 4,401,422 | 8/1983 | Amano et al. | 425/38 |
| 4,447,385 | 5/1984 | Blosser et al. | 264/315 |
| 4,472,125 | 9/1984 | Kubo et al. | 425/38 |

*Primary Examiner*—J. Howard Flint, Jr.
*Attorney, Agent, or Firm*—Renner, Otto, Boisselle & Lyon

[57] ABSTRACT

A tire press, loader and method employs a stationary bottom mold section and a vertically movable top mold section which moves upwardly to open the press clearing the area therebetween for discharge of the cured tire and loading of the green or uncured tire. The press loads the green tire initially into the top mold section centering and holding the top bead of the green tire on the bead ring of the top mold section. To position the uncured tire for such top loading there is provided a loader which engages the uncured tire at the lower shoulder of the tread area. The loader includes pivotally movable chuck sector assemblies, each mounted on a ring. The ring can readily be centered with respect to the axis of the mold sections and each assembly can be moved concurrently uniformly radially of the ring to accommodate tires of different sizes. The loader elevates the uncured tire from in front of the press and then positions it within the open press at the proper elevation with respect to the top mold section after the cured tire has cleared the press. The top mold section includes a mechanical chuck the segments of which then extend to flower from cylindrical form to a conical form of increasing apex angle and then to a horizontal plate form in which they are locked. With the tire held with respect to the upper bead ring, the press then closes until the bottom bead of the uncured tire is in contact with the bottom bead ring, which is mounted on top of a vertically movable bladder well or bead lift can. The beads may be seated by fluid pressure or subsequent action of the bladder. During opening of the press the bladder after at least partial deflation and the bringing of the bladder clamp rings together overlies the bottom bead of the cured tire. This ensures that the tire properly remains on the bottom bead ring during stripping from the upper mold half and then the lower mold half, and as the bladder is drawn into the bladder well or bead lift can.

43 Claims, 20 Drawing Figures

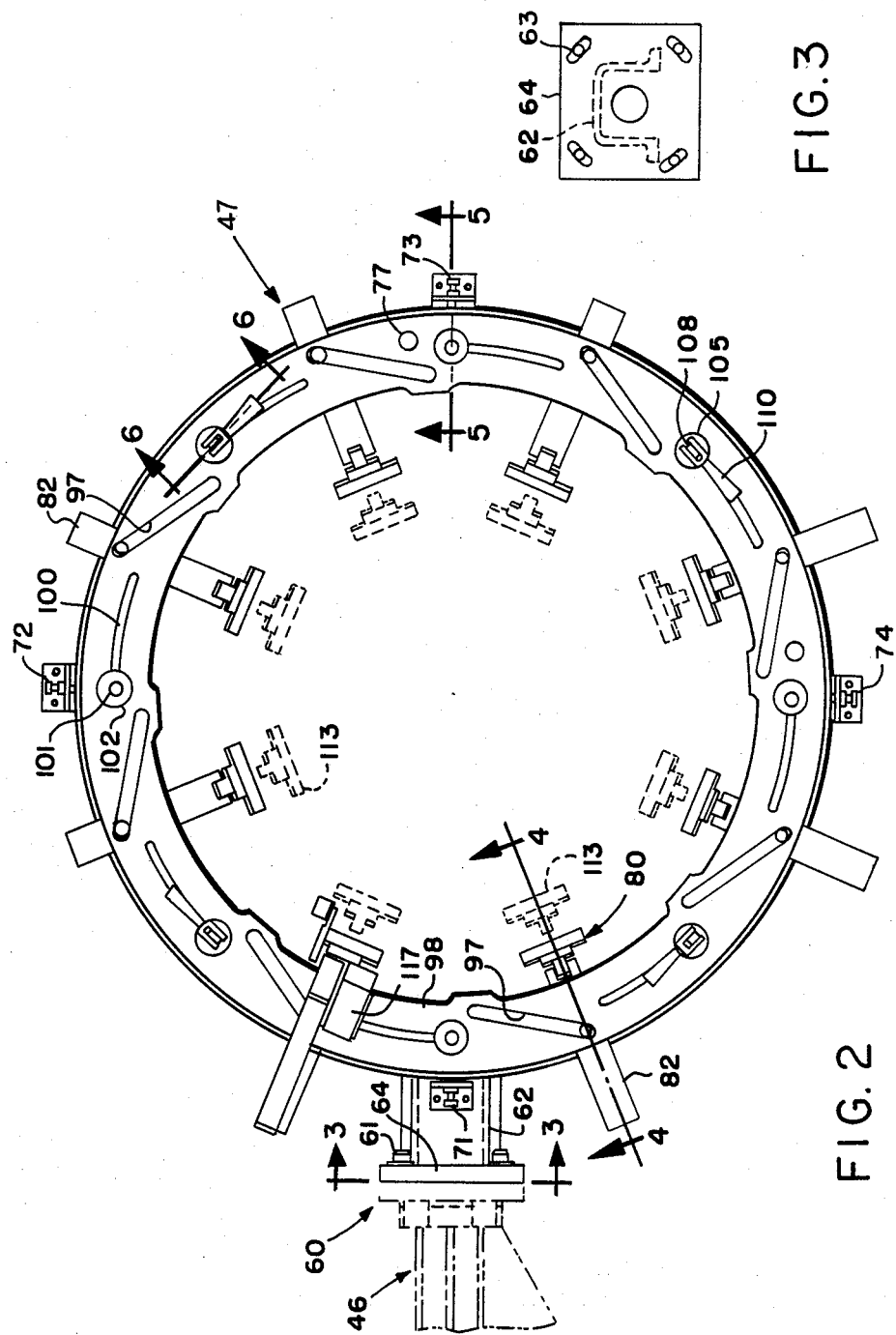

TIRE PRESS, LOADER AND METHOD

This invention relates generally as indicated to a tire press, loader and method, and more particularly to certain improvements in the loading of the uncured tires in the press, and the extraction of the cured tire from the press.

BACKGROUND OF THE INVENTION

The present invention relates to certain improvements in a tire press, loader and method of the type shown in U.S. Pat. No. 4,447,385 to Blosser et al dated May 8, 1984. Such prior patent discloses a top loading press, i.e. one in which the green tire is first centered and loaded into the top mold section, and then into the bottom mold section, as the press closes and the shaping bladder is inserted. Such sequence, of course, permits gravity to assist in proper centering and loading.

Such prior patent discloses a loader/unloader which comprises an inflatable bladder type ring adapted to grip the tread section of the uncured or cured tire for loading or unloading. This, of course, leaves the beads of the tire free to be controlled by the press. While such loader/unloader mechanism has proven quite acceptable, it nonetheless has certain drawbacks. For example, the loader chuck is difficult as a whole to center with respect to the centerline of the press. Perhaps more importantly, the chuck is limited in the range of tire sizes it can handle, thus requiring a replacement chuck if significant changes in tire sizes are made.

Also, such prior patent illustrates two embodiments of a chuck in the top mold section adapted to engage and grip the top bead of the uncured tire held by the loader and lift it centered for subsequent proper seating engagement with the bead ring of the top mold section. One embodiment utilizes a bladder chuck, while the other utilizes an essentially horizontal plate type chuck such as shown in prior U.S. Pat. No. 3,530,533 to Turk et al. The bladder type chuck, because of its yielding and flexible nature and construction has not proven totally acceptable with regard to centering of the top bead in the upper bead ring. It also has limited service life. The plate type chuck completely mechanically and unyieldingly controlled also has problems with regard to precise centering.

Also, problems may occur in the tire stripping process as shown in such prior patent in that the cured tire may not remain on the vertically movable bottom bead ring. To correct this problem as well as to facilitate the stripping of the bladder into its well or can on which the bottom bead ring may be mounted, it is desirable that the bladder act to hold the bottom bead of the cured tire as long as possible on the bottom bead ring, while nevertheless facilitating the removal of the shaping bladder from the cured tire. This then ensures the position of the cured tire for proper unloading, whether it be by the loader/unloader or by some other unloader mechanism.

SUMMARY OF THE INVENTION

A tire press, loader and method employs a stationary bottom mold section and a vertically movable top mold section which moves upwardly to open the press clearing the area therebetween for loading of the green or uncured tire and discharge of the cured tire in that order. The press loads the green tire initially into the top mold section centering and holding the top bead of the green tire on the bead ring of the top mold section.

To position the green tire for top loading there is provided a loader which engages the uncured tire at the lower shoulder of the tread area. The loader includes pivotally movable chuck sector assemblies, each mounted on a ring. The ring can readily be centered with respect to the axis of the mold sections and each assembly can be moved uniformly radially of the ring to accommodate tires of different sizes, which adjustments can be made without special tools. The loader may readily be assembled for size adjustment in two different ranges, one for larger tires and one for smaller tires. The loader elevates the uncured tire from in front of the press and then positions it within the open press at the proper elevation with respect to the top mold section after the cured tire has cleared the press.

The top mold section includes a mechanical chuck the segments of which then extend to flower from cylindrical form to a conical form of increasing apex angle and then to a horizontal plate form at which they are locked in such horizontal plate form. This then holds the upper bead of the uncured tire with respect to the top bead ring and enables the top bead of the uncured tire to be properly aligned with respect to the top mold section.

The press then closes until the bottom bead of the uncured tire is in contact with the vertically movable bottom bead ring which is mounted on top of a vertically movable bladder well or bead lift can. The beads may then be properly seated by fluid pressure or subsequent action of the bladder. The press continues to close with the bottom bead ring moving in synchronism with the top mold section and the bladder is inserted into the tire. This centers the tire on the bottom mold section as the press closes for curing.

During opening of the press the bladder after at least partial deflation and the bringing of the bladder clamp rings together overlies the bottom bead of the cured tire. This ensures that the tire properly remains on the bottom bead ring during stripping from the upper mold half and top bead ring. After such upper mold half stripping, the bead lift can elevates stripping the tire from the lower mold half. Because the bladder overlies the bottom bead and the bead ring at the top of the bladder well, the bladder clamp rings are carried along also elevating. This again ensures that the tire remains seated on the bottom bead ring during this movement. Since the bladder clamp rings reach the end of their stroke first, continued elevation of the bead lift can draws the bladder, now fully deflated uniformly from the tire. The upper and lower bladder clamp rings are then lowered properly positioning the bladder in the bladder can while the tire remains properly positioned on the now fully elevated bottom bead ring from which it may be removed by the loader above described, a mechanism identical to such loader, or other suitable unloading mechanism.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principles principals of the invention may be employed.

BRIEF DESCRIPTION OF THE DRAWINGS

In said annexed drawings:

FIG. 2 is a fragmentary enlarged top plan view of a chuck of the loader as taken substantially from the line 2—2 of FIG. 1;

FIG. 3 is a vertical section taken substantially on the line 3—3 of FIG. 2 illustrating the manner in which the chuck is mounted on the loader arm;

DETAILED DESCRIPTION OF THE PREFERRED EMBODIMENTS

Figure 1:
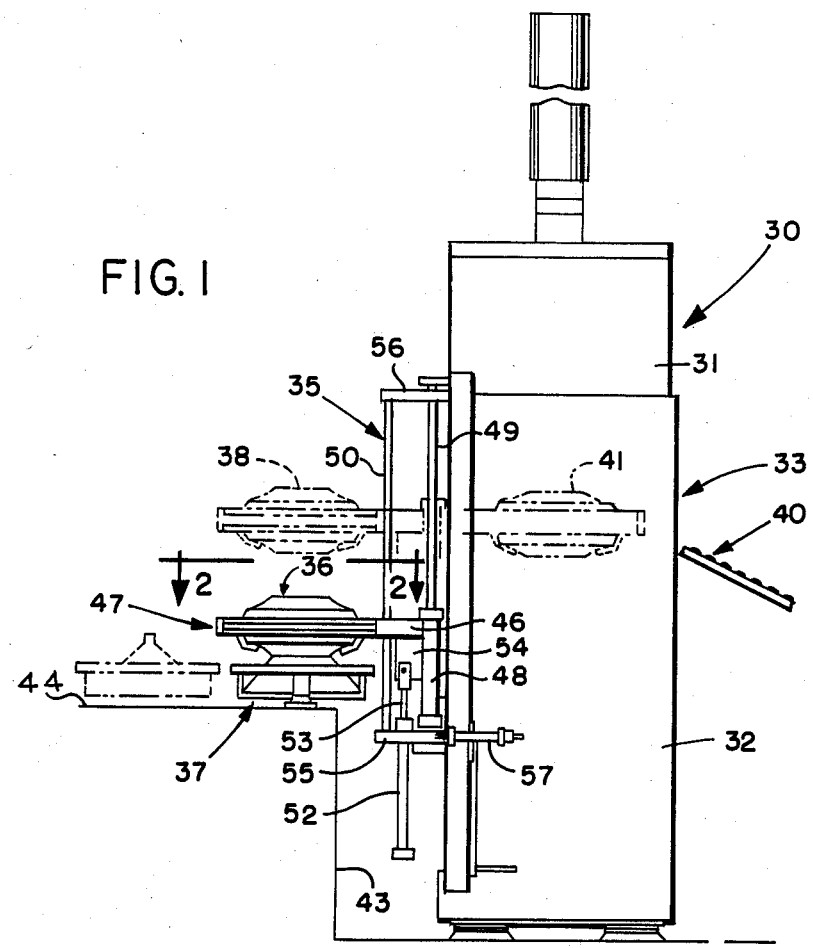
FIG. 1 is a schematic elevation of a tire press in accordance with the present invention illustrating the loader in the front of the press and some of the positions the loader achieves in positioning the uncured tire in the open press to be picked up by the chuck in the upper mold section.

Referring first to FIG. 1 there is illustrated a tire curing press shown generally at 30 in accordance with the present invention. The press may be generally similar to the press illustrated and described in U.S. Pat. No. 4,332,536 and which is sold by NRM Corporation of Columbiana, Ohio under the trademark AUTOLOK. The press comprises an upper vertically movable mold section 31 and a lower essentially stationary mold section 32. The upper mold section 31 is moved vertically when the press is opened by a vertically extending piston-cylinder assembly (not shown) normally positioned between the twin cavities of the press. When the press is opened, there is provided a fairly substantial window shown generally at 33 between the upper and lower mold sections. Each set of mold sections is provided with a loader shown generally at 35 adapted to pick up a green or uncured tire 36 from a loader stand 37 positioned in front of the press. The loader initially may move the uncured tire to the position 38 seen in phantom lines thus clearing the stand 37 for the positioning of yet another uncured tire. To facilitate this, the stand may shuttle to the phantom line position seen at 39. Normally, the uncured tire will remain at the position 38 until the press opens. The second tire may be positioned on the stand at any time during the cure cycle so that for at least a portion of the cure cycle there will be two uncured tires in front of each press cavity awaiting loading.

When the press is opened and the cured tire within the press has been discharged on a suitable unloader such as seen at 40, the window of the press is then open or clear and the loader then swings the tire from the position 38 to the position 41 axially aligned with the mold sections of the press.

As indicated, the press as well as a good part of the loader may be mounted in a pit 43 so that the stand 37 is mounted on the floor 44 in front of the press at approximately the same elevation as the top of the bottom mold section.

Each loader includes a horizontally extending arm 46 on which a loader chuck 47 is mounted. The proximal end of the loader arm is mounted on the top of cylindrical column 48 which is journaled on one vertical guide rod 49. The arm also extends in essence through and is also journaled on another parallel guide rod 50. Vertical movement of the arm 46 along such guide rods is obtained by piston-cylinder assembly 52, the rod 53 of which is clevis connected to gusset 54 extending between the column 48 and the arm 46. The cylinder is mounted on lower bracket 55, which like the upper bracket 56, supporting both guide rods, is journaled for horizontal swinging movement about a vertical axis, such swinging movement being obtained by piston-cylinder assembly 57. In any event the piston-cylinder assembly 52 is operative to raise and lower the chuck arm 46 while the piston-cylinder assembly 57 is operative to swing that chuck arm about its vertical axis of movement to and from a position outside the press window to a position within the press window.

Referring now additionally to FIGS. 2–6 it will be seen that the chuck 47 is mounted on the loader arm 46 by means of a flange connection 60 which includes four fasteners 61 extending between abutting flanges of the loader arm 46 and the relatively short arm 62. As indicated in FIG. 3 the fasteners 61 extend through arcuate slots 63 in the flange 64. Thus the connection is adjustable so that the plane of the loader basket 47 may be positioned parallel to the lower platen of the press or normal to the press axis.

Figure 4:
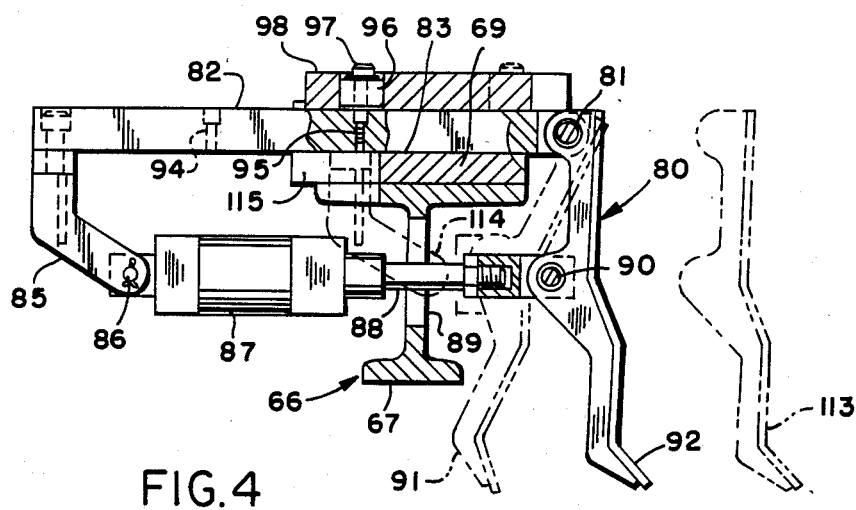
FIG. 4 is an enlarged fragmentary vertical section of a chuck sector assembly and its supporting ring as taken substantially on the line 4—4 of FIG. 2, the range of adjustments of the chuck sector for different tire sizes being shown in phantom lines.

The arm 62 is connected to circular basket base 66 which at the point of connection has the sectional configuration of the T-beam seen in FIG. 4. The lower flange 67 of the T-beam extends for approximately half the circumference of the base then tapers into the top flange so that the base away from the post has the sectional configuration seen more clearly in FIG. 5. Positioned on top of the base is a guide ring 69 which may be adjustably positioned on top of the base by four quadrant spaced jackscrews seen at 71, 72, 73 and 74 in FIG. 2. Each of the jackscrews extends through an L-shape bracket 75 with the brackets for the jackscrews 72, 73 and 74 being mounted on extensions of the base while the bracket for the jackscrew 71 is mounted on the arm 62. When the guide ring is properly positioned, it is secured to the base by a series of fasteners 77 threaded into the guide ring and extending through oversized holes 78 in the base. In this manner the loader chuck shoes, as a circular set, can readily be positioned concentric with the piston rod of the press post for the shaping and curing bladder which is also the axis of the press.

Referring now primarily to FIG. 4 it will be seen that the loader basket comprises a series of circularly arranged loader or chuck shoes 80 which are pin connected at their upper end at 81 to the inner end of a radially extending adjusting bar 82, each adjusting bar extending through a radial slot 83 in the top of guide ring 69. The outer or rear end of each adjusting bar is provided with a dog-leg bracket 85 which provides a lower pivot connection indicated at 86 for the blind end of piston-cylinder assembly 87. The rod 88 of the piston-cylinder assembly extends through aperture 89 in the web of the T-shape base and is pivotally connected at 90 to the exterior of the loader shoe 80. Extension and retraction of the piston-cylinder assembly causes the shoe to move about the pivot 81 from and to the phantom line position seen at 91. Each loader shoe is provided with an inturned bottom lip seen at 92 which is designed to engage the uncured tire at the lower shoulder of the tread, thus leaving the beads of the tire free for engagement and manipulation by the press as hereinafter described. If the device is used as an unloader, the cured tire will be similarly engaged. As indicated more clearly in FIG. 2 there are eight loader shoe and adjusting bar sub-assemblies and each slides in and out radially through such slots in the guide ring 69.

As illustrated in FIG. 4, each adjusting bar is provided with two radially spaced tapped holes seen at 94 and 95 in either of which alternately may be mounted cam follower 96. Each cam follower rides in angled slot 97 in cam ring 98 which ties all eight loader shoes 80 together as a circular set.

Figure 5:
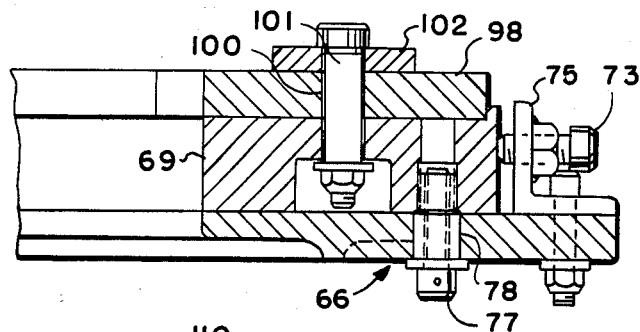
FIG. 5 is a view taken substantially on the line 5—5 of FIG. 2 illustrating the manner in which the supporting ring may be adjusted for concentricity.
Figure 6:
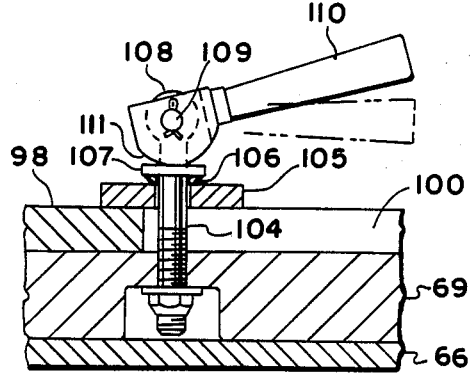
FIG. 6 is a vertical fragmentary section taken substantially from the line 6—6 of FIG. 2 illustrating the manner in which the ring may be moved to and locked in its position of tire size adjustment without special tools.

As seen in FIGS. 2, 5 and 6, intermediate the angled slots 97 the guide ring is provided with eight circumferential slots 100. Every other slot is provided with a guide post 101 secured to the guide ring 69, extending through the slot 100, and seating relatively large washer 102.

As seen more clearly in FIG. 6, every other circumferential slot 100 is provided with a locking post 104 secured to the guide ring 69, projecting through slot 100, through washer 105, and Belleville washer 106 which is loaded against floating washer 107. The upper end of the locking post terminates in an eye 108 through which pin-pivot 109 pivotally connects locking handle 110. The locking handle is provided with radial cams 111 on each side of the eye which bear against the floating washer 107. When the locking handle 110 is in the horizontal position indicated at 112, the floating washer is fully loaded against the Belleville washer and the cam ring is frictionally locked in place. When the handles are in the up or unlocked position they permit the cam ring readily to be moved thus moving the loading shoes radially through the range shown by the phantom line position 113 seen in FIG. 4.

Since each adjusting bar has two tapped holes for receiving the cam follower, when the cam followers are mounted in the inner position or that shown in FIG. 4, the loader basket has an adjustment range for large OD tires. However, when the cam followers are mounted at the other or outer position, the loader basket has an adjustment range for small OD tires. Such an adjustment range would be the same as that shown in FIG. 4 but the outer adjustment position would be the position shown in phantom lines at 113. At the inner end of such smaller OD adjustment range the bracket will achieve the position shown in phantom lines at 114 in FIG. 4 and for such reason slots 115 are provided in the guide ring 69 as well as the base to accommodate such bracket.

Thus by manipulation of the overcenter or toggle locking cam handles, without the aid of special tools, the cam ring 98 may be rotated manually in a clockwise direction as viewed in FIG. 2 to move the loader shoes radially outwardly as a set, while counterclockwise movement moves the loader shoes radially inwardly. The loader shoes may be locked in any desired position within the range of adjustment simply by moving the locking handles to a horizontal or overcenter locking position. Also, as seen in FIG. 2, the loader may be provided with a limit switch indicated at 117 which may be provided with a tire detector arm extending into the envelope of the chuck such that the limit switch may be tripped with either up or down actuation of the arm, thus extending or retracting the piston-cylinder assemblies 87.

In any event the loader is designed to grip the cured or uncured tire beneath the lower shoulder of the tread and either elevate the uncured tire to the position 41 within the window of the press or to remove the cured tire from the press.

Figure 7:
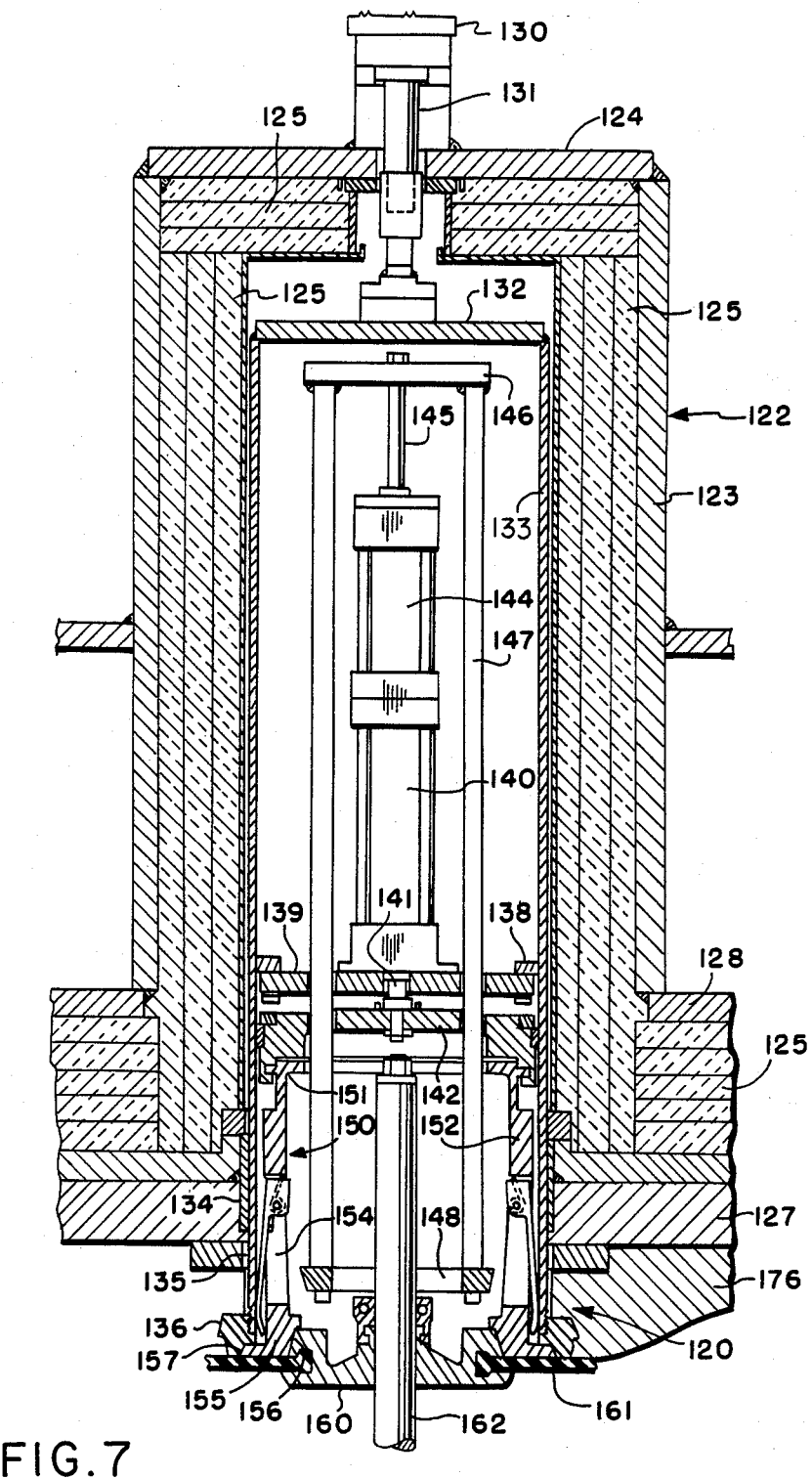
FIG. 7 is a fragmentary vertical section through the top mold section of the press illustrating the chuck for positioning and holding the top bead of the uncured tire in a position to be seated in the top bead ring.

Once the uncured tire is at the position 41 seen in FIG. 1, the upper bead of the tire is then engaged by a chuck shown generally at 120 in FIG. 7 which is in the top mold section. As indicated in FIG. 7, the top mold section includes an upper cylindrical cavity extension 122 which includes a cylindrical wall 123 closed by a top horizontal plate 124. The interior of the cavity is lined by layers of insulation shown at 125. Such layers of insulation also extend between the platen or bolster 127 and the plate 128 forming the bottom plate of the upper mold cavity structure.

Mounted on top of the top plate 124 is a mold ring actuator piston-cylinder assembly 130, the rod 131 of which is connected to the top plate 132 of cylinder or can 133. Such can is mounted for vertical movement in bushings 134 and 135 in the center opening of the platen at the lower end of the can. On the lower end of the can there is mounted the floating top bead or mold ring 136.

On the inside of the can 133 there is provided a relatively short flange 138 to which is secured a horizontal plate 139. Such plate supports the lower end of a tandem piston-cylinder assembly, the lower piston-cylinder assembly 140 of which includes a rod 141 extending through a central hole in the plate 139 and connected to plate 142. The upper piston-cylinder assembly 144 of such tandem assembly has its rod 145 extending upwardly and secured to a spoke type yoke 146 to which are connected a plurality of rods 147 which extend downwardly through plates 139 and 142 supporting a lock ring 148 on the lower end thereof.

The plate 142 is slidably mounted within the can 133 and supports a vertically movable tire chuck assembly 150 through the bayonet lock connection shown at 151. This permits the tire chuck assembly 150 to be readily removed and replaced. The chuck assembly 150 includes a relatively heavy cylindrical wall 152 which is slightly inwardly spaced from the interior of the can 133 supporting the mold ring 136. Such wall includes a plurality of windows 154 and terminates at its lower end in ring 155 which includes inwardly and outwardly directed flanges which include respectively pilot surfaces 156 and 157. The pilot surface 157 seats and centers the ring 155 on the interior of the mold ring 136. The pilot surface 156 provides a centering seat for the upper clamp ring 160 for the shaping bladder 161, such clamp ring being mounted on center post 162. The upper bladder clamp ring is of course adjustably mounted on such center post and the center post may extend with clearance well into the interior of the chuck assembly 150.

Figure 8:
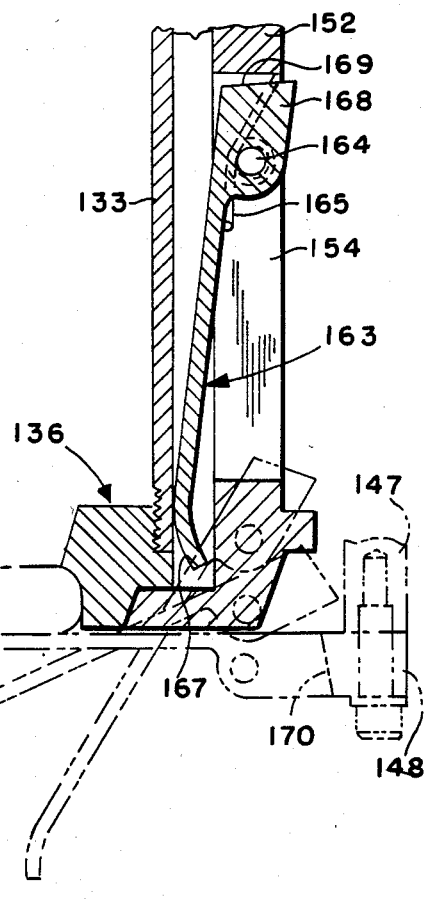
FIG. 8 is a schematic quarter section illustrating the positions achieved by the chuck sectors as the chuck extends and retracts.
Figure 9:
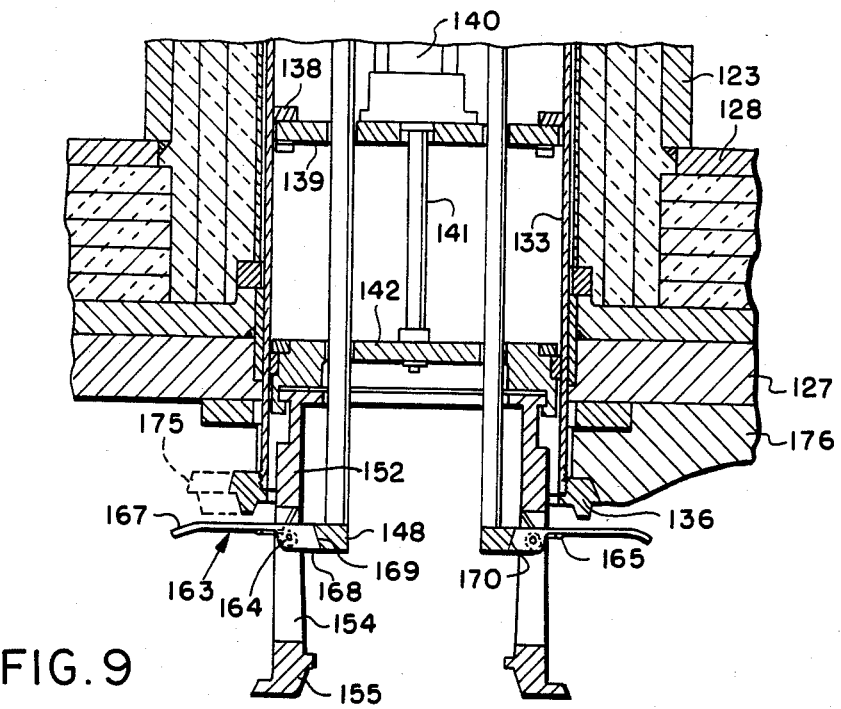
FIG. 9 is a fragmentary view similar to FIG. 7 but illustrating the chuck in the fully opened position.

Referring now additionally to FIGS. 8 and 9 it will be seen that each rectangular window in the chuck assembly is provided with a pivotally mounted chuck shoe 163. Such chuck shoes are pivoted at 164 on a horizontal axis and a coil spring 165 urges each chuck shoe to its horizontal or extended position as seen in FIG. 9.

The chuck shoe includes a slightly rounded outer edge or lip 167 and an enlarged inner boss 168 through which the pivot 164 extends. Such boss includes an inner angularly directed surface 169 adapted to mate with a complementary surface 170 on the exterior of the lock ring 148. Thus when the lock ring 148 is extended downwardly by retraction of the piston-cylinder assembly 144, the complementing surfaces 169 and 170 engage holding or locking the chuck shoes 163 in the horizontally extending position seen in FIG. 9.

Reverting to FIG. 8 it will be seen from the progressive positions of the chuck segments 163 that as the piston-cylinder assembly 140 extends projecting the rod 141 and the chuck with respect to the floating mold ring 136, the chuck shoes 163 ride down the inside of the can 133 and as they move from beneath the floating mold ring 136 they spring to the open position flowering to a conical condition of increasing apex angle until they are in the horizontal position beneath the floating mold ring. At such condition, the lock ring 148 is projected downwardly by retraction of the piston-cylinder assembly 144 locking the chuck shoes in the horizontal or extended position by the engagement of the locking surfaces 170 on such ring and the surfaces 169 on the chuck shoes. This then maintains the chuck in the fully extended position seen in FIG. 9. Up until the locking of the chuck shoes in such horizontal position by the vertical movement of the lock ring, the chuck segments are controlled solely by the action of the torsional springs 165. Because of the length and configuration of the chuck shoes 163, the same chuck may accommodate mold rings of varying diameter and thus tires of different sizes. For example, the chuck illustrated in FIG. 9 may accommodate a 13 inch floating mold ring as seen in full lines or a 16½ inch floating mold ring as seen by the phantom line position 175 on the lefthand side.

As seen in FIG. 8, it will be appreciated that initially the mold ring actuator can 133 has extended by action of the piston-cylinder assembly 130. This moves the mold ring 136 out of its seat with the upper side wall mold 176. Since the chuck assembly is mounted on a plate within such can, vertical movement of the floating mold ring also vertically moves the chuck assembly even though in its retracted position. Normally, the mold ring would move down until it is just touching the top bead of the tire which is still held by the loader. At such position, the piston-cylinder assembly 140 extends which moves the chuck assembly 150 downwardly within the interior of the lower portion of the floating mold ring can 133. As the chuck shoes 163 slide downwardly within the lower portion of the can, the springs 165 urge the chuck shoes outwardly forming a conical chuck of increasing apex angle as the chuck shoes clear interior edges of the floating mold ring. When the chuck shoes achieve their final horizontal position urged initially only by the springs, piston-cylinder assembly 144 then retracts bringing the lock ring 148 downwardly to seat behind the chuck shoes locking them in horizontal position. The top bead 177 of the green tire 36 is then mechanically locked in proper position for subsequent seating in the top mold section. The piston-cylinder assembly 130 is then retracted elevating the can 133 and of course the loader in its extended and locked position therewith. This reseats the floating mold ring in the top mold section 176 and clears the tire from the horizontal swinging plane of the loader. The loader then swings out of the way.

It will however be appreciated that the uncured tire loader basket of the present invention may be utilized with other than a top loading press. It will also be appreciated that the chuck of the top loading press of the present invention may be utilized with a different type of uncured tire loading chuck, so long as the top bead is free to be gripped and positioned by the press chuck.

Figures 10, 11:
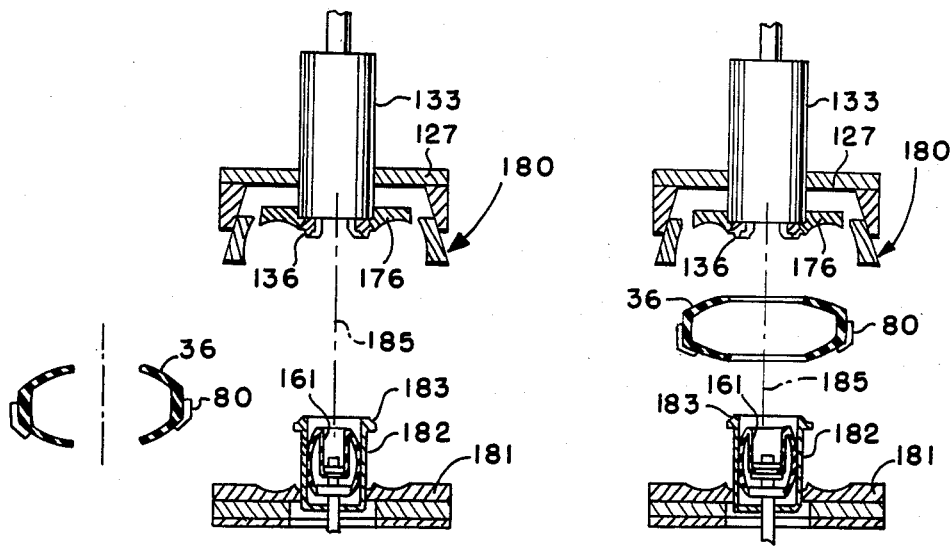
FIGS. 10–20 are sequence schematic views of the press moving through the loading, shaping, curing and stripping portions of the tire press cycle.

Referring now to the schematic FIGS. 10-20, the operation of a press in accordance with the present invention is perhaps better illustrated. In FIG. 10 it will be seen that the upper mold section includes the platen 127, the upper side wall mold section 176, and the floating bead ring 136 mounted on the can 133. The upper mold section may also include a sectional mold mechanism seen generally at 180. Such sectional mold mechanism is well known in the art and includes a number of tread mold sectors which move radially inwardly to form the tread portion of the mold cavity in the final closing of the press.

The bottom mold section 32 includes a bottom side wall mold section 181 surrounding vertically movable bladder well or can 182, on which the bottom bead ring 183 is mounted. As indicated in prior U.S. Pat. No. 4,332,536, the bottom mold section may be mounted for slight vertical movement through a relatively short clamping distance by high pressure hydraulic cylinders when the press is closed and locked.

In any event in FIG. 10 the loader has picked up the tire 36 from the stand in front of the press and the press is open. Vertical movement of the well 182 has stripped the previously cured tire from the bottom mold section and it has been removed by the unloader 40. The loader now swings horizontally to position the tire 36 generally within the window of the open press axially aligned with the center line 185 and parallel to the bottom mold section. As indicated, both the top and bottom beads of the green tire are free. Such position is seen in FIG. 11.

Figure 12:
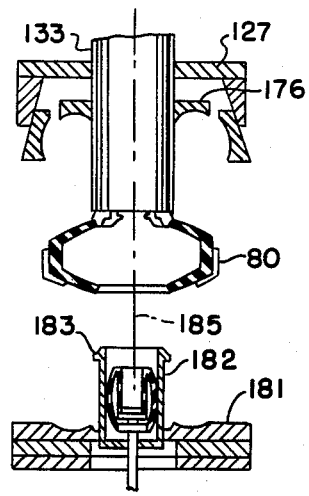
Figure 13:
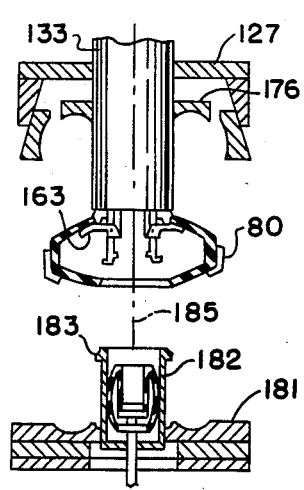

In FIG. 12, the floating top mold ring can 133 has extended to bring the floating top mold ring 136 into contact or close proximity with the upper bead of the uncured tire. At this point the tire is still supported by the loader. In FIG. 13 the tire chuck in the top mold section has been actuated to support and lock the upper bead of the tire in the proper position with respect to the floating mold ring.

Figure 14:
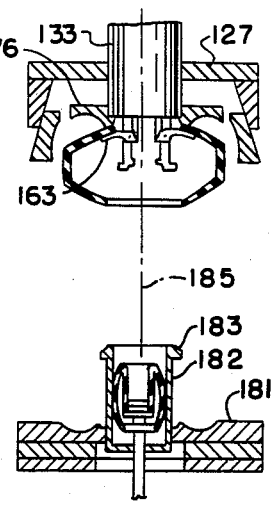

As seen in FIG. 14, the floating mold ring is then retracted with the chuck still in its extended and locked position elevating the uncured tire from the loader which then, upon proper clearance, swings out of the way and proceeds to pick up another green or uncured tire from in front of the press. The loader may then simply elevate the next uncured tire again to free the loader stand for deposit of yet another uncured tire.

Figure 15:
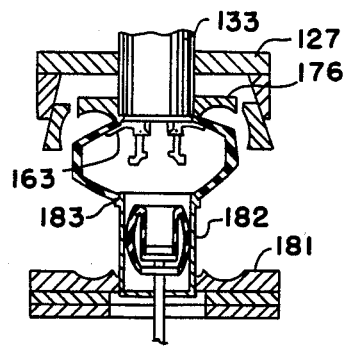

In FIG. 15 the press commences closing. As the upper mold section moves downwardly with the top bead properly positioned with respect to the upper floating bead ring, the bottom bead of the tire will be brought into contact with the bead ring 183 at the top of the bladder well 182. At this point the press head or upper mold section and the bladder well move downwardly in synchronism. At this point or subsequently, the interior of the uncured tire may be partially pressurized to seat the beads of the uncured tire on both the upper bead ring 136 and the lower bead ring 183. Before the bladder is inserted, the chuck in the top mold section is retracted first by extending the piston-cylinder assembly 144 and then retracting the piston-cylinder assembly 140.

Figure 16:
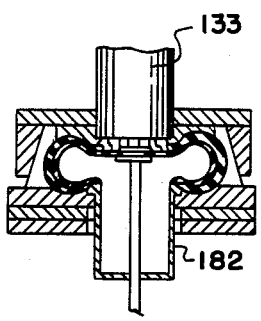

As seen in FIG. 16 the press has fully closed with the sectional mold mechanism being closed about the tread portion of the tire. The bladder well is fully down and the bladder is inserted. The press mold sections at this time are locked together and clamped by the high pressure hydraulic squeeze noted. At this time the bladder 161 is fully inserted into the tire and is pressurized. The cure cycle continues until the now shaped tire is cured.

Figure 17:
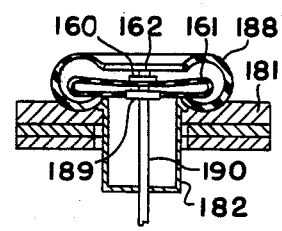

As seen in FIG. 17, the press has now been opened and the upper mold half has been stripped away from the cured tire 188. The bladder 161 has been at least partially deflated and the upper and lower bladder clamp rings have been brought to a position in relatively close proximity. For this purpose, the lower bladder clamp ring is mounted on top of a cylindrical post 190 sliding over post 162. At this point the bladder well 182 is still down.

Figure 18:
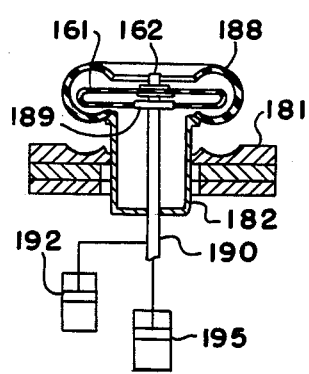

Referring now to FIG. 18, it will be seen that the bladder well 182 which includes the bottom bead ring 183 has been elevated, stripping the cured tire 188 from the lower mold section. This action of elevating the well 182 also at least initially elevates both the upper and lower bladder clamp rings 162 and 189 dragging them along with the bladder 161 overlying the bottom bead of the cured tire. This action continues until the piston-cylinder assembly 192 actuating the lower bladder clamp ring has reached the end of its stroke.

Figure 19:
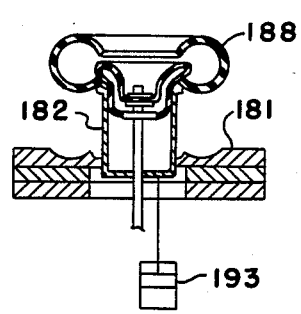

As seen in FIG. 19, the well 182 continues upwardly until its propelling cylinders 193 reach the end of their strokes causing the bladder 187 to be drawn from the cured tire as indicated with the well partially enveloping the bladder.

Figure 20:
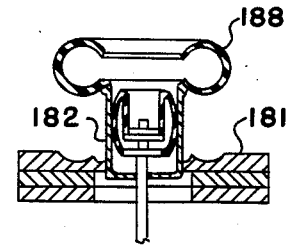

As seen in FIG. 20, the lower bladder clamp ring and the upper bladder clamp ring, by the action of their respective piston-cylinder assemblies 192 and 195 are lowered together, completely enveloping the bladder inside the well 182.

This method of stripping a cured tire from the lower mold half ensures that the cured tire remains properly on the bead ring during stripping and prevents buttonhooking or cocking of the cured tire on the bead ring. In this manner the cured tire is properly horizontally positioned for unloading.

Although the invention has been shown and described with respect to certain preferred embodiments, it is obvious that equivalent alterations and modifications will occur to others skilled in the art upon the reading and understanding of this specification. The present invention includes all such equivalent alterations and modifications, and is limited only by the scope of the following claims.

We claim:

1. A tire curing press loader comprising a support ring, a series of chuck shoe assemblies mounted on said ring, each assembly including an actuator for the respective chuck shoe to grip or release a tire, and means mounting said chuck assemblies on said ring for uniform simultaneous expansion or contraction to accommodate tires of different sizes.

2. A loader as set forth in claim 1 wherein each assembly includes a radially movable bar mounted on said ring, a cam follower extending from said bar, and cam means operative to engage each follower to move each said assembly uniformly radially.

3. A loader as set forth in claim 2 wherein said cam means comprises a cam ring adjacent said support ring and movable circumferentially, said cam ring comprising a series of linear cam slots each extending at a common angle with respect to the circumference of said cam ring and each slot confining a respective cam follower.

4. A loader as set forth in claim 3 wherein said cam ring overlies said support ring, and includes circumferential slots maintaining said cam ring in proper position with respect to said support ring.

5. A loader as set forth in claim 4 including handle-clamp means operative to move said cam ring upon release without the aid of special tools.

6. A loader as set forth in claim 5 including means to center said support ring with respect to the centerline of the press.

7. A loader as set forth in claim 6 including a base supporting said support ring, said last mentioned means comprising jack screws on said base engaging said support ring.

8. A loader as set forth in claim 2 including means to reposition each said cam follower on each said bar to obtain a different range of expansion or contraction by operation of said cam means.

9. A loader as set forth in claim 2 including a chuck shoe pivotally mounted on the inner end of each bar, said respective actuator being pivotally connected to said chuck shoe.

10. A loader as set forth in claim 9 wherein said chuck shoe is pivoted at its top to said bar and includes a lower inwardly directed lip adapted to engage beneath the lower shoulder of the tread portion of the tire when the actuator is extended.

11. A loader as set forth in claim 10 including a bracket extending from said bar and pivotally supporting one end of said actuator.

12. A loader as set forth in claim 1 including mast arm means to move said support ring vertically and horizontally to pick up an uncured tire and position it in an open press, and means mounting said support ring on said mast arm means for adjustment about the axis of said mast arm means.

13. A loader as set forth in claim 1 including a horizontally extending arm supporting said support ring for the required loading movement, and means mounting said support ring on said arm for adjustment about the axis of said arm.

14. A tire press loader comprising a series of chuck segments each movable radially to grip and release an uncured tire, respective actuators for each segment, ring means supporting said segments and the respective actuators, and means mounting said segments and actuators on said ring means for uniform simultaneous radial expansion and contraction to accommodate tires of different sizes.

15. A loader as set forth in claim 14 including annular cam means operative when rotated thus to move said segments and actuators for such expansion or contraction.

16. A loader as set forth in claim 15 including handle means operative to move said annular cam means, said handle means being movable from one position to another, said handle in one position locking said annular cam means against movement, and in said another position releasing said annular cam means for movement.

17. A loader as set forth in claim 16 wherein said handle means is pivotally mounted.

18. A loader as set forth in claim 17 wherein said one position of said handle is essentially parallel to said annular cam means, and said another position is extending from said annular cam means.

19. A tire curing press loader comprising a support ring, a series of chuck shoes mounted on said support ring, actuator means to extend and retract said chuck shoes to grip and release an uncured tire, and means mounting said chuck shoes on said support ring uniformly to expand and contract the gripping range thereof to accommodate tires of different sizes.

20. A loader as set forth in claim 19 wherein said last mentioned means comprises an annular cam, and cam follower means for each chuck shoe.

21. A loader as set forth in claim 20 wherein each chuck shoe is supported by a radially extending bar, said respective cam follower extending from said bar.

22. A loader as set forth in claim 21 wherein said annular cam is positioned adjacent said bars, and means to rotate said annular cam and lock it in a selected position.

23. A tire curing press comprising separable mold sections, each having a bead ring, a loader chuck in at least one of said mold sections comprising chuck segments movable from a retracted cylindrical condition to a progressively increasing apex angle conical condition and then to an extended horizontal condition to engage the uncured tire bead and properly position it on the bead ring of the mold section pivot means for each chuck segment, and means vertically to move each pivot means to cause said chuck segments to move to said extended condition in which the chuck is mounted.

24. A tire press as set forth in claim 23 including spring means for each chuck segment operative to move each segment independently of the other from such cylindrical to such conical condition.

25. A tire press as set forth in claim 24 including means to lock said chuck segments as a whole in said horizontal extended condition.

26. A tire press as set forth in claim 25 including means vertically to move the bead ring of the mold section in which the chuck is mounted, and means to move said chuck in either extended or retracted condition with said bead ring.

27. A tire press as set forth in claim 26 wherein said bead ring is mounted on the end of a vertically movable can, and means mounting said loader chuck on the interior of said can for movement therewith.

28. A tire press as set forth in claim 27 wherein said loader chuck includes an annular frame movable vertically in the portion of said can adjacent the bead ring, and windows in said frame in which said chuck segments are pivotally mounted.

29. A tire press as set forth in claim 28 wherein said annular frame moves closely adjacent the interior of said can, and said chuck segments are pivoted at the inner end of said windows with the outer end of said segments being provided with a slightly arcuate surface riding against the interior of said can in the retracted condition.

30. A tire press as set forth in claim 29 wherein the inner end of each chuck segment includes a boss accommodating the pivot connection, said boss including an inner angularly directed locking surface.

31. A tire press as set forth in claim 30 including a locking ring having a locking surface complementary to the locking surface on each chuck segment such that when said surfaces are in engagement, the segments are locked in horizontal position.

32. A tire press as set forth in claim 31 including means to move said frame and locking ring independently.

33. A tire press as set forth in claim 32 wherein said last mentioned means comprises back-to-back piston-cylinder assemblies mounted on the interior of said can and movable therewith.

34. A tire press as set forth in claim 33 wherein said loader chuck is mounted in the upper mold section for loading the upper bead of the uncured tire first in the top mold section.

35. A tire curing press including relatively movable top and bottom mold sections each including a bead ring, a tire loader in the upper of said mold sections which includes a plurality of chuck segments movable from a generally cylindrical condition when retracted to a progressively increasing apex angle conical condition and then to an extended horizontal condition as extended into the uncured tire to engage the uncured tire on the bead ring of the top mold section pivot means for each chuck segment, and means vertically to move each pivot means to cause said chuck segments to move to said extended condition.

36. A tire press as set forth in claim 35 including spring means for each chuck segment operative to move each segment independently of the other from such cylindrical to such conical condition.

37. A tire press as set forth in claim 36 including means to lock said chuck segments as a whole in said horizontal extended condition.

38. A tire press as set forth in claim 37 including means vertically to move the bead ring of the mold section in which the chuck is mounted, and means to move said chuck in either extended or retracted condition with said bead ring.

39. A tire press as set forth in claim 38 wherein said bead ring is mounted on the end of a vertically movable can, and means mounting said loader chuck on the interior of said can for movement therewith.

40. A tire curing press comprising upper and lower relatively movable mold sections, said bottom mold section including a vertically movable bladder well in the center of said mold section with the bead ring of the lower mold section on the upper end thereof, a shaping bladder mounted on bladder clamp rings on respective post sections extending coaxially from the bottom of the well, means to move said bladder clamp rings independently of each other to position the bladder in an uncured tire for shaping and drawing the bladder from the cured tire for stripping and unloading, means at least partially to deflate the bladder following cure to retain the bladder overlying the bottom bead of the cured tire, means to elevate the bladder well and the cured tire with the bladder overhanging the bottom bead to retain the cured tire on the bottom bead ring, continued upward movement of the well bringing the bladder clamps to the end of their movement with further upward movement drawing the bladder from the cured tire into the well.

41. A method of stripping a tire from a tire press which includes a bladder and a vertically movable bottom mold ring comprising the steps of at least partially deflating the bladder and positioning it in such condition overlying the bottom bead of the tire to hold it on the bottom mold ring, elevating the bottom mold ring and the bladder in such condition therewith, and continuing to elevate the mold ring while holding the bladder against movement to draw the bladder from the tire.

42. The method of claim 41 wherein such mold ring is mounted on the top of a vertically movable bladder well.

43. The method of claim 42 wherein said bladder includes relatively movable clamp rings.

* * * * *